United States Patent [19]
Simonds

[11] Patent Number: 4,918,742
[45] Date of Patent: Apr. 17, 1990

[54] IMAGE PROCESSING USING MULTI-PASS CONVOLUTION WITH SMALL KERNELS

[75] Inventor: Robert M. Simonds, Mercer Island, Wash.

[73] Assignee: The Boeing Company, Seattle, Wash.

[21] Appl. No.: 185,100

[22] Filed: Apr. 22, 1988

[51] Int. Cl.$^4$ .................... G06F 15/31; H04N 5/21
[52] U.S. Cl. .................................. 382/41; 382/27; 382/42; 382/49; 364/724.12; 364/724.19
[58] Field of Search ............. 364/518, 521, 724, 725, 364/728, 819, 826, 724.05, 724.12, 724.19; 382/41, 42, 43, 49, 27

[56] References Cited

U.S. PATENT DOCUMENTS

| | | |
|---|---|---|
| 4,048,485 | 10/1977 | Nussbaumer . |
| 4,064,082 | 12/1977 | Nussbaumer . |
| 4,118,784 | 10/1978 | Nussbaumer ............ 364/724.12 |
| 4,330,833 | 5/1982 | Pratt et al. . |
| 4,493,048 | 1/1985 | Kung et al. . |
| 4,768,156 | 8/1988 | Whitehouse ............ 364/521 |

OTHER PUBLICATIONS

Jullien: "A Two Dimensional Finite Field Processor for Image Filtering"—Int. Conference on Acoustics—Apr. 1981—pp. 1140–1143.
Hall: "Real-Time Image Enhancement Using 3×3 Pixel Neighborhood Operator Functions"—Optical Engineering—May 1980; pp. 421–424.
Pratt, W., "Intelligent Image Processing Display Terminal", *Advances in Display Technology*, (reprint), SPIE, vol. 199, pp. 189–194, (1979).
Abramatic, J. F. and Faugeras, O., "Design of Two-Dimensional Fir Filters from 'Small' Generating Kernels", *IEEE Transaction on Circuits and Systems*, vol. CH1318, pp. 116–118, (May 1978).
Danielsson, P. and Levialdi, S., "Computer Architectures for Pictorial Information Systems", *IEEE Transaction Computers*, pp. 53–67, (Nov. 1981).

*Primary Examiner*—Reinhard J. Eisenzopf
*Assistant Examiner*—Jose M. Solis
*Attorney, Agent, or Firm*—Christensen, O'Connor, Johnson & Kindness

[57] ABSTRACT

Method and apparatus for image processing in which an image array is convolved with a kernel. The convolution is carried out with a decomposed form of the kernel that is a linear combination of one or more terms, at least one term being the convolutional product of two or more primitive kernels. Each primitive kernel has a center element, and even or odd parity with respect to reflection about the center element along each of the dimensions of the image array. One apparatus for carrying out the invention comprises a parallel processor associated with at least one dimension of the image array. The parallel processor receives parallel input data comprising a one-dimensional input portion of the image array extending along such dimension, and convolves the input data with the decomposed form of the kernel.

21 Claims, 3 Drawing Sheets

IMAGE PROCESSING USING MULTI-PASS CONVOLUTION WITH SMALL KERNELS

FIELD OF THE INVENTION

The present invention relates to image processing, and in particular to a method and apparatus for processing an image by convolving a large kernel with the image, using multi-pass applications of small kernels.

BACKGROUND OF THE INVENTION

Convolution techniques are used for a variety of image processing purposes. For two-dimensional images, convolution is employed for machine vision, pattern recognition, edge detection, edge enhancement by unsharp masking, spatial frequency filtering, and even deconvolution of images degraded by various aberrations produced in the image formation process. However, enthusiasm for convolutional techniques in image processing has been dampened by the fact that convolutions with large kernels on conventional sequential data processors is computationally expensive. The use of large kernels has therefore usually been restricted to applications in which speed of execution is not a major constraint.

Parallel data processing techniques could in principle relieve the execution time constraint of the convolution approach. Of primary concern in the development of parallel architectures for image processing is the efficient use of low-level, logical and arithmetic processes. By identifying and massively using such processes, processor architecture can be optimized for the most efficient execution, and high throughput rates can be achieved. In one frequently described approach, a separate elementary processor is assigned to each image element (i.e., pixel) in a two-dimensional image array, and data available to each processor is limited such that the operations performed by the processor depend on input data received from processors in a restricted local neighborhood. In a familiar rectangular scan format, a particular image pixel and its associated processor may be considered to have four neighbors, those to the north, south, east and west. Examples of parallel processors using this architecture are the DAP and MPP architectures. Alternatively, access may be granted to data from pixels along the diagonals as well, resulting in an eight-neighbor architecture such as the ClipIV architecture. Finally, six-neighbor architecture may result from hexagonal scan formats such as the diff3 scan format. However these architectures are limited to convolutions with 3×3 kernels, and therefore cannot directly operate with the large kernels that are required by general image processing. For example, such architectures cannot perform mean filtering or matched filtering over large support regions. This limitation has stimulated new approaches of dealing with large kernel requirements, utilizing small kernel architecture and multi-pass processing.

A paper entitled *Design of Two-Dimensional FIR Filters From "Small" Generating Kernels*, J. F. Abramatic and O. D. Saugeras, Proceedings IEEE Conference on Pattern Recognition and Image Processing, Chicago, Ill., May 1978, described a technique for decomposing a large kernel into the sequential application of 3×3 kernels. The Abramatic/Saugeras technique has come to be referred to as the small generating kernel (SGK) method. Subsequently, a simpler method of using the SGK technique was found by Pratt, and is set forth in U.S. Pat. No. 4,330,833. However, a drawback of the SGK method is that it requires complex and lengthy off-line calculations as a preliminary step in providing constants for the look-up tables used in the implementation. This involves a singular value decomposition of the large kernel, which necessitates a calculation of the eigenvalues of the product of the kernel and its transpose.

SUMMARY OF THE INVENTION

The present invention is directed to a new method for image processing that involves the decomposition of a large kernel into small kernels by making use of the symmetry properties of the large kernel. Evaluation of the decomposed kernels may then be implemented by using a set of five convolutional primitives applicable on four-neighbor processor architectures, or an augmented set of nine primitives applicable to eight-neighbor processor architectures.

In one preferred aspect, the present invention provides a method for processing an image represented by a multi-dimensional array of image elements. The method carries out the convolution of the image array with a kernel by convolving the array with a decomposed form of the kernel to produce a modified array. The decomposed form comprises a linear combination of one or more terms, at least one term comprising the convolutional product of two or more primitive kernels. Each primitive kernel has a center element and has even or odd parity with respect to reflection about the center element along each of the dimensions of the image array. In a preferred embodiment, each primitive kernel has no more than three elements along any dimension of the array, permitting the method to be carried out by parallel processors with restricted local data access.

In another aspect, the present invention provides an apparatus for processing an image represented by a multi-dimensional array of image elements. The apparatus comprises memory means for storing the image array, and a parallel processor associated with at least one dimension of the image array. The parallel processor comprises means for receiving, in parallel, input data comprising a one-dimensional input portion of the image array extending along said one dimension, and means for convolving the input data with a decomposed form of the kernel. Specific architectures for the parallel processor are also described.

DETAILED DESCRIPTION OF THE INVENTION

Figure 1:
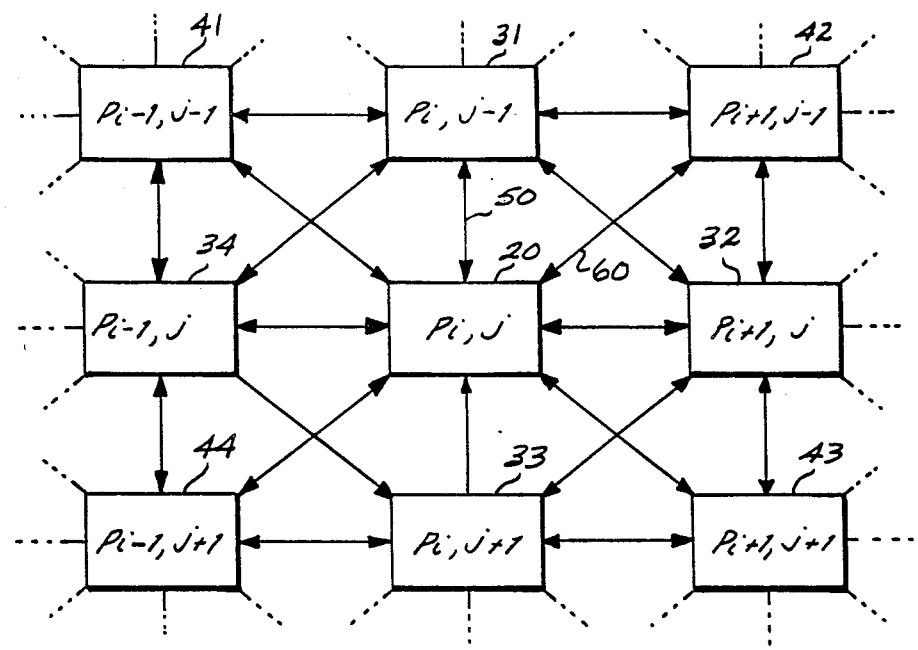
FIG. 1 is a schematic view showing a parallel processing architecture with restricted neighborhood data access.

Unless otherwise noted, two-dimensional image arrays are denoted herein by an overscore, $\overline{A}$, $\overline{B}$, etc., with array elements $\overline{a}_{i,j}$ $\overline{b}_{i,j}$, and convolutional kernels are represented by upper case symbols U, V, etc., with elements $u_{i,j}$ and $v_{i,j}$. The discrete convolution of a two-dimensional array $\overline{A}$ by an m×n kernel U is given by the usual definition:

$$\overline{c}_{i,j} = \sum_{k=1}^{m} \sum_{l=1}^{n} u_{k,l} a_{i-k,j-l} \tag{1}$$

where $\overline{c}_{i,j}$ is the output array element, and i and j index the array rows and columns, respectively. In more compact form, $\overline{C} = U * \overline{A}$, where * represents the convolution operator. Most commonly, convolutions on image arrays take place over a symmetric neighborhood, requiring that the kernels have odd dimensions. The convention assumed for indexing kernel elements is shown, for example, by the 3×3 kernel, $$U = \begin{bmatrix} u_{-1,-1} & u_{-1,0} & u_{-1,1} \\ u_{0,-1} & u_{0,0} & u_{0,1} \\ u_{1,-1} & u_{1,0} & u_{1,1} \end{bmatrix} \tag{2}$$

without obvious extensions to larger one- or two-dimensional kernels and to kernels having more than two dimensions. If a kernel has an even number of rows or columns, along a given dimension, then the kernel may be padded with zeros such that it has an odd number of elements along that dimension. It is assumed that the elements of U are real numbers and in general, kernels are not necessarily square, that is, m≠n. The kernel may or may not be separable. If it is separable and dimensioned m×n, it may be generated by the matrix outer product, $U = VW^T$, where V and W are column matrices dimensioned m×1 and n×1, respectively.

Most parallel two-dimensional processor architectures for image processing may be classified as either four- or eight-neighbor architectures. The four-neighbor processor performs arithmetic operations using the center element $u_{0,0}$ and the elements $u_{-1,0}$, $u_{0,1}$, $u_{1,0}$, and $u_{0,-1}$ of the 3×3 neighborhood. An eight-neighbor architecture uses all of the preceding elements as well as the four corner elements.

Since most of the algebra to follow consists of convolution operations, the notation will be simplified by replacing the symbol * with implied multiplication. For example, the double convolution of kernel U on array $\overline{A}$ will be abbreviated from $U * U * \overline{A}$ to $UU\overline{A}$ or simply, $U^2\overline{A}$, and $U * V * \overline{A}$ will be simplified to $UV\overline{A}$. Where multiplication is required, it will be indicated explicitly by the symbol "×".

Convolution is both commutative and associative, hence once the convolution symbol * is omitted, the appearance of an algebra of convolutional operators is similar to that of ordinary symbolic algebra. Convolutional kernels are commutative, meaning GH=HG and G+H=H+G, and associative, meaning GGH=G(GH)=(GG)H=$G^2$H and GH+H=(G+I)H=H(G+I), where I is the convolutional identity. Thus the generation of large and complex convolutional kernels may be symbolized by the manipulation of algebraic operators with the same rules as the real variable system, with the exceptions that division is not defined.

ORTHOGONAL DECOMPOSITIONS

The technique utilized in connection with the present invention involves the decomposition of large kernels into smaller, primitive kernels of definite parity. For orthogonal decompositions that will be discussed first, "definite parity" means that a kernel is either symmetric (even) or antisymmetric (odd) upon reversing the sign of each of its indices. With the indices defined as in Equation 2, this is equivalent to reflections about the central row and column of the kernel. A two-dimensional kernel U has even parity with respect to the first (row) index if $u_{-i,j} = u_{i,j}$, and odd parity with respect to the row index if $u_{-i,j} = -u_{i,j}$. Even and odd parities can be defined for the second (column) index in a similar manner, with the result that a two-dimensional kernel may have four states of definite parity. In the first state, the kernel is even under interchange of either index. In the second and third states, the kernel is even under interchange of one index and odd under interchange of the other index. In the fourth state, the kernel is odd with respect to interchange of either index. This approach may be extended to higher dimensional kernels in a straight-forward manner.

A two-dimensional kernel is said to have a definite state of parity if it satisfies the requirements of one of the four states, described above. In accordance with the present invention, if an image array is to be convolved with a kernel U that does not have definite parity, the kernel U may be decomposed into the sum of a subkernel $U^{++}$ having even-even parity, a subkernel $U^{+-}$ having even-odd parity, a subkernel $U^{-+}$ having odd-even parity, and a subkernel $U^{--}$ having odd-odd parity. The elements of these four definite parity subkernels are determined as follows:

$$u^+{}_{i,j}{}^+ = (u_{i,j} + u_{i,-j} + u_{-i,j} + u_{-i,-j})/4 \tag{3a}$$

$$u^+{}_{i,j}{}^- = (u_{i,j} - u_{i,-j} + u_{-i,j} - u_{-i,-j})/4 \tag{3b}$$

$$u^-{}_{i,j}{}^+ = (u_{i,j} + u_{i,-j} - u_{-i,j} - u_{-i,-j})/4 \tag{3c}$$

$$u^-{}_{i,j}{}^- = (u_{i,j} - u_{i,-j} - u_{-i,j} + u_{-i,-j})/4 \tag{3d}$$

The sum of these subkernels is equal to the original kernel U, and each subkernel has definite parity by construction.

In the case of a four-neighbor architecture, there are four primitive kernels, plus the identity kernel, that have definite parity. Aside from possible multiplicative constants these are:

$$H = [1 \; 0 \; 1] \tag{4}$$

$$V_1 = \begin{bmatrix} 1 \\ 0 \\ 1 \end{bmatrix} \tag{5}$$

$$H_1^* = [1 \; 0 \; -1] \tag{6}$$

$$V_1^* = \begin{bmatrix} 1 \\ 0 \\ -1 \end{bmatrix} \tag{7}$$

$H_1$ and $H_1^*$ perform arithmetic operations on elements in the same row of an image array, namely, $\bar{c}_{i,j}=\bar{a}_{i,j-1}\pm\bar{a}_{i,j+1}$ and $V_1$ and $V_1^*$ perform the column operations, $\bar{c}_{i,j}=\bar{a}_{i-1,j}\pm\bar{a}_{i+1,j}$. Forming the convolutional products of the four primitives produces four additional kernels that, together with the primitive kernels described above, can be used to implement an eight-neighbor architecture. These additional kernels are as follows:

$$H_1V_1 = \begin{bmatrix} 1 & 0 & 1 \\ 0 & 0 & 0 \\ 1 & 0 & 1 \end{bmatrix} \tag{8a}$$

$$H_1^*V_1 = \begin{bmatrix} 1 & 0 & -1 \\ 0 & 0 & 0 \\ 1 & 0 & -1 \end{bmatrix} \tag{8b}$$

$$H_1V_1^* = \begin{bmatrix} 1 & 0 & 1 \\ 0 & 0 & 0 \\ -1 & 0 & -1 \end{bmatrix} \tag{8c}$$

$$H_1^*V_1^* = \begin{bmatrix} 1 & 0 & -1 \\ 0 & 0 & 0 \\ -1 & 0 & 1 \end{bmatrix} \tag{8d}$$

Each of these products, as well as the primitives of Equations 4–7, has definite parity. The identity kernel:

$$I = [0\ 1\ 0] = \begin{bmatrix} 0 \\ 1 \\ 0 \end{bmatrix} \tag{9}$$

completes the primitives necessary to implement an algebra of convolution operators. Once an arbitrary kernel is decomposed into one or more subkernels of definite parity, each subkernel may be expressed as a bilinear combination of the primitives. For example, a 3×3 even-even kernel may be represented by a bilinear combination of I, $H_1$ and $V_1$, and an odd-even kernel by a combination of I, $H_1$ and $V_1^*$.

An example of an even-even kernel is the so-called mean filter, a two-dimensional moving average that can be expressed as the separable bilinear combination of the even-even primitives:

$$\begin{bmatrix} 1 & 1 & 1 \\ 1 & 1 & 1 \\ 1 & 1 & 1 \end{bmatrix} = (I + H_1)(I + V_1) \tag{10}$$

Calculation of the mean filter by direct application of the definition requires eight operations, whereas separation of the kernel into sequential row and column operations allows it to be done with four.

As a second example, consider the generalized Sobel operators. These generate 2-D gradients at 45 degree intervals in the image plane:

$$S_0 = \begin{bmatrix} -1 & 0 & 1 \\ -2 & 0 & 2 \\ -1 & 0 & 1 \end{bmatrix}$$

$$S_1 = \begin{bmatrix} 0 & 1 & 2 \\ -1 & 0 & 1 \\ -2 & -1 & 0 \end{bmatrix}$$

$$S_2 = \begin{bmatrix} 1 & 2 & 1 \\ 0 & 0 & 0 \\ -1 & -2 & -1 \end{bmatrix}$$

$$S_3 = \begin{bmatrix} 2 & 1 & 0 \\ 1 & 0 & -1 \\ 0 & -1 & -2 \end{bmatrix}$$

$S_0$ has even-odd parity and $S_2$ has odd-even parity. These may be decomposed into primitives as follows:

$$S_0 = -(2+V_1)H_1^* \tag{11a}$$

$$S_2 = (2+H_1)V_1^* \tag{11b}$$

Neither $S_1$ nor $S_3$ has definite parity. However using Equation 3b and 3c they may be factored into sums of subkernels that do possess definite parity and the subkernels can then be decomposed into primitives as follows:

$$S_1 = \begin{bmatrix} -1 & 0 & 1 \\ -1 & 0 & 1 \\ -1 & 0 & 1 \end{bmatrix} + \begin{bmatrix} 1 & 1 & 1 \\ 0 & 0 & 0 \\ -1 & -1 & -1 \end{bmatrix} = \tag{11c}$$

$$-(I+V_1)H_1^* + (I+H_1)V_1^*$$

$$S_3 = \begin{bmatrix} 1 & 0 & -1 \\ 1 & 0 & -1 \\ 1 & 0 & -1 \end{bmatrix} + \begin{bmatrix} 1 & 1 & 1 \\ 0 & 0 & 0 \\ -1 & -1 & -1 \end{bmatrix} = \tag{11d}$$

$$(I+V_1)H_1^* + (I+H_1)V_1^*$$

The main result of these manipulations is the reduction in the required number of arithmetic operations. Calculating the four Sobel operators from the definitions in Equation 1 requires a total of 28 operations per image array element if operations on null kernel elements can be omitted, 40 if they cannot. Using Equations 11a–11d, taking advantage of the fact that the terms $(I+H_1)V_1^*$ and $(I+V_1)H_1^*$ each occur in three of the kernels, reduces calculations of the four kernels to a total of 12 operations.

What has been demonstrated is that an arbitrary 3×3 kernel may be synthesized by multiple applications of five convolutional primitives defined on a four-neighbor architecture. This method depends on the symmetry of kernels with respect to reflection about the row and column axes of the image array. As is shown below, a second decomposition is obtained by considering reflections about the diagonals.

DIAGONAL DECOMPOSITIONS

The second method of decomposition requires definite parity with respect to reflections about the two diagonals. Symmetry or antisymmetry about the main diagonal requires that the kernel be even or odd, respectively, under the interchange of i and j. This is the familiar matrix transpose operation. Symmetry about the second diagonal requires that the kernel be even or odd under interchange of i and $-j$. Referring to the indexing shown by Equation 2, it may be seen that an arbitrary two-dimensional kernel U may be decomposed into at most four subkernels with well defined diagonal parity as follows:

$$u^+_{i,j}{}^+ = (u_{i,j} + u_{-j,-i} + u_{j,i} + u_{-i,-j})/4 \tag{12a}$$

$$u^+_{i,j}{}^- = (u_{i,j} - u_{-j,-i} + u_{j,i} - u_{-i,-j})/4 \tag{12b}$$

$$u^-_{i,j}{}^+ = (u_{i,j} + u_{-j,-i} - u_{j,i} - u_{-i,-j})/4 \tag{12c}$$

$$u^-_{i,j}{}^- = (u_{i,j} - u_{-j,-i} - u_{j,i} + u_{-i,-j})/4 \tag{12d}$$

Thus $U^{++}$ has even-even symmetry with respect to reflections through the main and secondary diagonals, respectively, $U^{+-}$ has even-odd symmetry, $U^{-+}$ has odd-even symmetry and $U^{--}$ is odd under reflection about either diagonal.

In order to generate subkernels with diagonal symmetry, it is necessary to define four new primitives which perform arithmetic operations on the corner elements of an eight-neighbor architecture. These are, $$R_1 = (H_1 V_1 - H_1^* V_1^*)/2 = \begin{bmatrix} 0 & 0 & 1 \\ 0 & 0 & 0 \\ 1 & 0 & 0 \end{bmatrix} \tag{13}$$

$$L_1 = (H_1 V_1 + H_1^* V_1^*)/2 = \begin{bmatrix} 1 & 0 & 0 \\ 0 & 0 & 0 \\ 0 & 0 & 1 \end{bmatrix} \tag{14}$$

$$R_1^* = (-H_1^* V_1 + H_1 V_1^*)/2 = \begin{bmatrix} 0 & 0 & 1 \\ 0 & 0 & 0 \\ -1 & 0 & 0 \end{bmatrix} \tag{15}$$

$$L_1^* = (H_1^* V_1 + H_1 V_1^*)/2 = \begin{bmatrix} 1 & 0 & 0 \\ 0 & 0 & 0 \\ 0 & 0 & -1 \end{bmatrix} \tag{16}$$

The primitives required for the orthogonal decomposition, Equations 4–7 and 9, are still necessary, so that representations of kernels resulting from diagonal decomposition require a total of eight primitives plus the identity. The diagonal primitives in Equations 13–16 are also expressed in terms of the four-neighbor primitives to emphasize the fact that the diagonal primitives may be derived from the orthogonal primitives, but the reverse does not obtain. In that sense then, the orthogonal symmetry primitives may be considered to be the more fundamental of the two sets.

Again, consider the Sobel operators as an example. $S_1$ and $S_3$ have inherent diagonal odd-even and even-odd symmetry, respectively, so they may be written directly as:

$$S_1 = \begin{bmatrix} 0 & 1 & 2 \\ -1 & 0 & 1 \\ -2 & -1 & 0 \end{bmatrix} = 2R_1^* - H_1^* + V_1^* \tag{17}$$

$$S_3 = \begin{bmatrix} 2 & 1 & 0 \\ 1 & 0 & -1 \\ 0 & -1 & -2 \end{bmatrix} = 2L_1^* - H_1^* + V_1^* \tag{18}$$

The kernel $S_0$ can be decomposed into even-odd and odd-even subkernels by use of Equations 13b and 13c, and written in terms of the diagonal primitives as follows:

$$S_0 = \begin{bmatrix} -1 & -1 & 0 \\ -1 & 0 & 1 \\ 0 & 1 & 1 \end{bmatrix} + \begin{bmatrix} 0 & 1 & 1 \\ -1 & 0 & 1 \\ -1 & -1 & 0 \end{bmatrix} = \tag{19}$$

$$(L_1^* + H_1^* + V_1^*) + (R_1^* - H_1^* + V_1^*)$$

Decomposition of $S_2$ produces:

$$S_2 = \begin{bmatrix} 1 & 1 & 0 \\ 1 & 0 & -1 \\ 0 & -1 & -1 \end{bmatrix} + \begin{bmatrix} 0 & 1 & 1 \\ -1 & 0 & 1 \\ -1 & -1 & 0 \end{bmatrix} = \tag{20}$$

$$(L_1^* + H_1^* + V_1^*) + (R_1^* - H_1^* + V_1^*)$$

A point to notice here is that the strings $L_1^* + H_1^* + V_1^*$ and $R_1^* - H_1^* + V_1^*$ each occur in the decomposition of three of the four kernels. After these are calculated, it requires only four more operations to complete calculation of all the Sobel operators. Thus diagonal decomposition requires a total of 16 operations as compared with 12 for the orthogonal decomposition symmetries and a minimum of 28 operations required for a brute force calculation.

LARGE KERNEL GENERATION

The decomposition of kernels and subkernels larger than $3 \times 3$ is preferably carried out by means of a procedure for generating longer one-dimensional kernels of definite parity. In particular, a method is desired for generating kernels of the form:

$$H_k = [1\ 0\ 0\ \ldots\ 0 \pm 1] \tag{21}$$

containing $2k+1$ elements in which the right hand element is positive (negative) for even (odd) parity. This may be done by repeated applications of the primitive $H_1$:

$$H_1 H_1 = [1\ 0\ 1][1\ 0\ 1] = [1\ 0\ 2\ 0\ 1] = H_2 + 2I \tag{22}$$

$$H_1 H_2 = [1\ 0\ 1\ 0\ 1\ 0\ 1] = H_3 + H_1 \tag{23}$$

$$H_1 H_3 = [1\ 0\ 1\ 0\ 0\ 0\ 1\ 0\ 1] = H_4 + H_2 \tag{24}$$

The recursion relation for generating $H_k$ for $k > 2$ is:

$$H_k = H_1 H_{k-1} - H_{k-2} \tag{25}$$

For $k = 2$, $H_2$ is obtained from Equation 22.

Odd parity operators $H_k^*$ are also generated by repeated applications of $H_1$, as follows:

$$H_1H_1^* = [1\ 0\ 1][1\ 0\ -1] = [1\ 0\ 0\ 0\ -1] = H_2^* \quad (26)$$

$$H_1H_2^* = [1\ 0\ 1\ 0\ -1\ 0\ -1] = H_3^* + H_1^* \quad (27)$$

$$H_1H_3^* = [1\ 0\ 1\ 0\ 0\ 0\ -1\ 0\ -1] = H_4^* + H_2^* \quad (28)$$

and the recursion relation for the odd parity kernels for $k > 2$ is:

$$H_k^* = H_1 H_{k-1}^* - H_{k-2}^* \quad (29)$$

while for $k=2$, $H_2^* = H_1 H_1^*$ from Equation 26. While these recursion relations have been shown for generating the $H_k$, kernels they may be generalized to any of the other convolutional primitives. Letting U represent any one of the operators H, V, R or L, it may be shown that:

$$U_k = U_1 U_{k-1} - U_{k-2} \quad k > 2 \quad (30a)$$

$$U_k^* = U_1 U_{k-1}^* - U_{k-2}^* \quad k > 2 \quad (30b)$$

$$U_2 = U_1^2 - 2I \quad (30c)$$

$$U_2^* = U_1 U_1^* \quad (30d)$$

It is also useful to express these relations in terms of a matrix which perform a linear transformation between the $k \times 1$ matrix $(I, H_1, H_2 \ldots H_{k-1})^T$, and the $k \times 1$ matrix containing powers of the $H_1$ primitive $(I, H_1, H_1^2, \ldots H_1^{k-1})^T$. This transformation is done by the $k \times k$ matrix P:

$$\begin{bmatrix} I \\ H_1 \\ H_2 \\ H_3 \\ \cdot \\ \cdot \\ \cdot \end{bmatrix} = P \times \quad (31)$$

$$\begin{bmatrix} I \\ H_1 \\ H_1^2 \\ H_1^3 \\ \cdot \\ \cdot \end{bmatrix} = \begin{bmatrix} 1 & & & & \\ 0 & 1 & & & \\ -2 & 0 & 1 & & \\ 0 & -3 & 0 & 1 & \\ \cdot & & & & \\ \cdot & & & & \end{bmatrix} \times \begin{bmatrix} I \\ H_1 \\ H_1^2 \\ H_1^3 \\ \cdot \\ \cdot \end{bmatrix}$$

The elements $p_{i,j}$ of P may be deduced from Equations 30a and 30c. They are zero above the diagonal, and have the recursion relations:

$$p_{i,j} = p_{i-1,j-1} - p_{i-2,j} \quad i > 2, j > 0$$

$$p_{i,j} = -p_{i-2,j} \quad i > 2, j = 0$$

For $i \leq 2$, P is defined by Equation 31. Rows and columns of P are indexed such that element $p_{0,0}$ is at the upper left hand corner of P, and i and j range from zero to $k-1$. The x symbol is used in Equation 31 to emphasize that the expansion is done by normal matrix multiplication. After expansion, the implied multiplications require convolution. It should be noted that since the operators $V_k$ are generated by the same recursion relations as $H_k$, the matrix P provides an analogous transformation between column matrices of $V_k$ and a column matrix of powers of $V_1$.

Similarly, odd parity operators are transformed by the square matrix Q:

$$\begin{bmatrix} I \\ H_1^* \\ H_2^* \\ H_3^* \\ \cdot \\ \cdot \end{bmatrix} = Q \times \quad (32)$$

$$\begin{bmatrix} I \\ H_1^* \\ H_1 H_1^* \\ H_1^2 H_1^* \\ \cdot \\ \cdot \end{bmatrix} = \begin{bmatrix} 1 & & & & \\ 0 & 1 & & & \\ 0 & 0 & 1 & & \\ 0 & -1 & 0 & 1 & \\ \cdot & & & \cdot & \\ \cdot & & & & \cdot \end{bmatrix} \times \begin{bmatrix} I \\ H_1^* \\ H_1 H_1^* \\ H_1^2 H_1^* \\ \cdot \\ \cdot \end{bmatrix}$$

The elements of Q for $i > 2$ have recursion relations similar to those for the matrix P:

$$q_{i,j} = q_{i-1,j-1} - q_{i-2,j} \quad i > 2, j > 0$$

$$q_{i,j} = -q_{i-2,j} \quad i > 2, j = 0$$

For $i \leq 2$, Q is the $i \times i$ identity matrix. Using summation notation, any one of the even parity operators on the left of Equation 31 may be written:

$$H_l = \sum_{k=0}^{l} P_{l,k} H_1^k \quad (33a)$$

and any odd operator from Equation 32 by the summation:

$$H_l^* = H_1^* \sum_{k=0}^{l} q_{l,k} H_1^{k-1} \quad (33b)$$

where the interpretation is used that $H_1^{-1} = H_1^0 = I$. Again, these relations are valid for both $H_1$ and $V_1$.

With the ability to construct $H_k$ and $V_k$ for arbitrary k plus the transformation from the $H_k$, $V_k$ to polynomials in the $1 \times 3$ primitives, it is possible to decompose kernels of arbitrary size. Given an $m \times n$ kernel W, the following procedure reduces it to a sequence of operations with the orthogonal convolutional primitives. The first step is to decompose the kernel into at most four non-zero subkernels of definite parity using the row-column symmetry operations of Equation 3. Formally, this results in the decomposition:

$$W = W^{++} + W^{+-} + W^{-+} + W^{--}$$

Associated with each of the four possible subkernels in the decomposition is a unique combination of convolutional primitives which produces it. For example, by construction, $W^{++}$ contains only elements satisfying the symmetry $w^+_{i,j}{}^+ = w^+_{-i,j}{}^+ = w^+_{i,-j}{}^+ = w^+_{-i,-j}{}^+$. These four terms constitute the sparse, $i \times j$, even-even kernel, $w^+_{i,j}{}^+ V_i H_j$, containing only four non-zero elements. The sum of sparse kernels for all $i, j \geq 0$ then is the original $W^{++}$:

$$W^{++} = \sum_{i=0}^{m'} \sum_{j=0}^{n'} w^+_{i,j}{}^+ H_j V_i$$

The limits, m' and n' are given by m'=[m/2] and n'=[n/2], where the square brackets indicate truncation to the integer part of the quotient. The occurrence of any $H_j$ or $V_i$ with subscript zero is to be interpreted as the identity. Then using Equation 33a to convert the $H_j$ and $V_i$ to 3 element primitives yields the quadratic form:

$$W^{++} = \sum_{i,k=0}^{m'} \sum_{j,l=0}^{n'} p_{i,l} w^+_{i,j}{}^+ p_{j,k} H_1^k V_1^l \quad (34a)$$

Elements of the second subkernel $W^{+-}$ are odd with respect to reflection about the vertical, which is the same symmetry of the convolutional products, $H_j^* V_i$ for all i and j. Hence the sum of sparse kernels is:

$$\begin{aligned} W^{+-} &= -\sum_{i=0}^{m'} \sum_{j=0}^{n'} w^+_{i,j}{}^- H_j^* V_i \\ &= -H_1^* \sum_{i,k=0}^{m'} \sum_{j,l=0}^{n'} p_{i,l} w^+_{i,j}{}^- q_{j,k} H_1^{k-1} V_1^l \end{aligned} \quad (34b)$$

Elements of the third subkernel $W^{-+}$ are odd with respect to reflection about the horizontal. These terms are defined by a sum of sparse convolutional products $H_j V_i^*$, each of which has the required odd-even symmetry property.

$$\begin{aligned} W^{-+} &= -\sum_{i=0}^{m'} \sum_{j=0}^{n'} w^-_{i,j}{}^+ H_j V_i^* \\ &= -V_1^* \sum_{i,k=0}^{m'} \sum_{j,l=0}^{n'} q_{i,l} w^-_{i,j}{}^+ p_{j,k} H_1^k V_1^{l-1} \end{aligned} \quad (34c)$$

Finally, the elements of the subkernel $W^{--}$ are odd with respect to reflections about either the vertical or horizontal. These terms are uniquely defined by the sum of convolutional products $H_j^* V_i^*$:

$$\begin{aligned} W^{--} &= \sum_{i=0}^{m'} \sum_{j=0}^{n'} w^-_{i,j}{}^- H_j^* V_i^* \\ &= H_1^* V_1^* \sum_{i,k=0}^{m'} \sum_{j,l=0}^{n'} Q_{i,l} w^-_{i,j}{}^- Q_{j,k} H_1^{k-1} V_1^{l-1} \end{aligned} \quad (34d)$$

Equations 34a–34d define the general method of decomposing an arbitrary kernel into a sum of operations with the five $1 \times 3$ kernels of Equations 4–7 and 9. It may be seen that the index ranges used for summing over i and j make use of elements in the lower right hand quadrant of the W subkernels. This is arbitrary and affects only the leading sign in Equation 34. For example, using the alternate limits of $-m' \leq i \leq 0$ and $-n' \leq j \leq 0$, i.e., using the upper left hand quadrant of the W subkernels, simply removes the leading minus signs from Equations 34b and 34c.

While they are written in summation notation, it is possible to express Equations 34a–34d in a matrix notation, as well. For example Equation 34a is equivalent to the matrix equation:

$$W^{++} = \bar{V}^T \times P^T \times \widetilde{W}^{++} \times P \times \bar{H}$$

in which $\bar{H}$ and $\bar{V}$ are the column vectors containing powers of $H_1$ and $V_1$, and the matrix $W^{++}$ is an $m' \times n'$ submatrix of $\widetilde{W}^{++}$ defined by: $\widetilde{w}^+_{i,j}{}^+ = w^+_{i,j}{}^+$, for $i = 0, 1, \ldots m'$ and $j = 0, 1, \ldots n'$. The superscript T indicates matrix transpose.

As an example of the image processing technique of the present invention, consider the following $7 \times 5$ kernel which may be a useful template for detection of line segments oriented at 110° to the horizontal axis.

$$W = \begin{bmatrix} 4 & 96 & 0 & 0 & 0 \\ 0 & 80 & 20 & 0 & 0 \\ 0 & 32 & 67 & 0 & 0 \\ 0 & 0 & 99 & 0 & 0 \\ 0 & 0 & 67 & 32 & 0 \\ 0 & 0 & 20 & 80 & 0 \\ 0 & 0 & 0 & 96 & 4 \end{bmatrix}$$

Since W lacks definite parity, applying Equation 3 produces an even-even and odd-odd pair of subkernels:

$$W = W^{++} + W^{--} =$$

$$\begin{bmatrix} 2 & 48 & 0 & 48 & 2 \\ 0 & 40 & 20 & 40 & 0 \\ 0 & 16 & 67 & 16 & 0 \\ 0 & 0 & 99 & 0 & 0 \\ 0 & 16 & 67 & 16 & 0 \\ 0 & 40 & 20 & 40 & 0 \\ 2 & 48 & 0 & 48 & 2 \end{bmatrix} + \begin{bmatrix} 2 & 48 & 0 & -48 & -2 \\ 0 & 40 & 0 & -40 & 0 \\ 0 & 16 & 0 & -16 & 0 \\ 0 & 0 & 0 & 0 & 0 \\ 0 & -16 & 0 & 16 & 0 \\ 0 & -40 & 0 & 40 & 0 \\ -2 & -48 & 0 & 48 & 2 \end{bmatrix}$$

Evaluation of $W^{++}$ requires the use of Equation 34a, and the operation of this is readily interpreted as a matrix calculation. The terms $\widetilde{w}^+_{i,j}{}^+$ are the $4 \times 3$ ($m' \times n'$) elements of $W^{++}$, the lower right hand quadrant of the kernel. This is premultiplied by $P^T (4 \times 4)$ and postmultiplied by P ($3 \times 3$). If the $3 \times 1$ column vector of powers of the primitive, $H_1$ is defined as $\bar{H} = (I, H_1, H_1^2)^T$, and the $4 \times 1$ vector $\bar{V} = (I, V_1, V_1^2, V_1^3)^T$, $W^{++}$ may be expressed as the expansion of the matrix product:

$$W^{++} = V^T \times \begin{bmatrix} 1 & 0. & -2 & 0 \\ 0 & 1 & 0 & -3 \\ 0 & 0 & 1 & 0 \\ 0 & 0 & 0 & 1 \end{bmatrix} \times \begin{bmatrix} 99 & 0 & 0 \\ 67 & 16 & 0 \\ 20 & 40 & 0 \\ 0 & 48 & 2 \end{bmatrix} \times \begin{bmatrix} 1 & 0 & 0 \\ 0 & 1 & 0 \\ -2 & 0 & 1 \end{bmatrix} \times H \quad (35)$$

$$= V^T \times \begin{bmatrix} 59 & -80 & 0 \\ 79 & -128 & -6 \\ 20 & 40 & 0 \\ -4 & 48 & 2 \end{bmatrix} \times H$$

The expansion of $W^{--}$ by Equation 34d may also be illustrated by a matrix representation. In this case, the $m' \times n'$ submatrix of $W^-$ is premultiplied by $Q^T$ and postmultiplied by Q, since the kernel is odd with respect to either index. Then setting $\widetilde{H}^* = H_1^*(I, I, H_1)^T$ and $\widetilde{V}^* = V_1^*(I, I, V_1, V_1^2)^T$, $W^{--}$ can be written:

$$W^{--} = V^{*T} \times \begin{bmatrix} 1 & 0 & 0 & 0 \\ 0 & 1 & 0 & -1 \\ 0 & 0 & 1 & 0 \\ 0 & 0 & 0 & 1 \end{bmatrix} \times \begin{bmatrix} 0 & 0 & 0 \\ 0 & 16 & 0 \\ 0 & 40 & 0 \\ 0 & 48 & 2 \end{bmatrix} \times \begin{bmatrix} 1 & 0 & 0 \\ 0 & 1 & 0 \\ 0 & 0 & 1 \end{bmatrix} \times H^* \quad (36)$$

$$= V^{*T} \times \begin{bmatrix} 0 & 0 & 0 \\ 0 & -32 & -2 \\ 0 & 40 & 0 \\ 0 & 48 & 2 \end{bmatrix} \times H^*$$

Performing the indicated matrix operations of Equations 35 and 36, yields the convolutional expression for the line detector kernel as a function solely of $1 \times 3$ primitives:

$$W = 59 + V_1(79 + V_1(20 - 4V_1)) + \quad (37)$$
$$H_1(-80 + V_1(-128 - 6H_1 + V_1(40 + V_1(48 + 2H_1)))) +$$
$$H_1^*V_1^*(-32 - 2H_1 + V_1(40 + V_1(48 + 2H_1)))$$

Making use of the fact that the term $V_1(40 + V_1(48 + 2H_1))$ occurs twice, and counting multiplication and addition as equivalent operations, the decomposition of the original kernel as set forth in Equation 39 requires 35 operations per image pixel. A brute force application of the $7 \times 5$ original requires 26 operations if null elements can be omitted, 70 if they cannot. This example is a case in which the decomposition may or may not produce a more efficient calculation for a sequential processor, depending upon the particular implementation of the processor. Equation 39 does, however, permit the convolution W to be performed in a very efficient manner on a parallel processor having as little as four-neighbor data access.

SPATIAL FREQUENCY FILTERING

The discussion to this point, has centered on the decomposition of large kernels into a representation specifying a sequence of applications of the five primitives of Equations 4-7 and 9. Another class of operations utilizes the fact that repeated application of certain $3 \times 3$ kernels tends to a Gaussian in the limit of a large number of iterations. The variance of the resulting Gaussian and the rate of convergence can be calculated, and the variance is directly proportional to the number of repetitions of the generating kernel. If a one dimensional kernel has the form (1,a,1), where a is some constant, it is straightforward to show that N applications of the kernel are equivalent to a single convolution using a kernel with a variance of $2N/(2+a)$. Since the Fourier transform of a Gaussian with variance $\sigma^2$ is again a Gaussian with variance $1/(2\pi\sigma)^2$, N applications of the small kernel act as a low pass filter with a bandwidth that varies as $N^{-1}$. In the spatial frequency domain, a single convolutional pass with the kernel (1,a,1) is equivalent to multiplying the original frequency spectrum with the Fourier transform of the kernel: $a + 2\cos\omega$. N convolutions is equivalent to multiplying the original spectrum by $(a + 2\cos\omega)^N$, aside from normalizing constants. The spatial frequency $\omega$ has the normalized range $(-\pi, \pi)$, where $\omega = \pm\pi$ represents the Nyquist sampling frequency. The choice $a = 2$ yields a filter of the form $(1 + \cos\omega)^N$ which avoids phase reversals in the spatial frequency domain, and has a variance which increases as $N/2$ per convolutional pass. In two dimensions, the generalization of this may be written as the Gaussian operator:

$$G = (2 + H_1)^M(2 + V_1)^N \quad (38)$$

where the M is not necessarily equal to N, allowing for the generation of circular or elliptical filters.

At the other end of the spatial frequency spectrum, a kernel of the form, $(-1, a, -1)$, for example $a - H_1$, is a high pass filter. As was the case with the low pass filter, the frequency spectrum of the kernel is free of phase reversals if a is chosen to be 2, in which case the spectrum becomes proportional to $(1 - \cos\omega)^N$ for N passes, and the width of the high frequency pass band decreases as $N^{-1}$.

In two dimensions, the lowest order high pass filter has the form $(2 - H_1)(2 - V_1)$. An alternate is the sum of separable components, $4 - H_1 - V_1$, which will be recognized as the discrete approximation to the two-dimensional continuous variable Laplacian operator. The combined Laplacian and Gaussian operator is:

$$\nabla^2 G = (4 - H_1 - V_1)(2 + H_1)^N(2 + V_1)^N \quad (39)$$

If N=0, the operator $\nabla^2$ picks out the edges associated with objects consisting principally of high spatial frequencies. As N increases, the operator becomes increasingly sensitive to objects of ever decreasing spatial frequencies. In processing required of machine vision, Equation 41 implies considerable economy in computational requirements, since the frequency bands of interest may be extracted periodically as N increases. Intermediate results at $N=N_1<N_2<N_3\ldots N_k$ may be selected for use in higher level processing without the necessity of requiring separate channels for the computation of each spatial frequency band.

This invention provides methods of realizing large convolutional kernels by multiple application of primitives defined on a $3\times3$ neighborhood. Using symmetry operations, kernels of arbitrary size, symmetry and separability may be decomposed into a multi-pass sequence of convolutions using five primitives for processors having four-neighbor architecture, and nine primitives for processors having eight-neighbor architectures. An example of a parallel processing system having four- or eight-neighbor architectures is shown in FIG. 1. In this arrangement, the processors P are arranged in a rectangular array, and each processor calculates and stores one or more attributes, such as intensity or color, of a single image element or pixel of an image. In FIG. 1, processor 20 represents an arbitrary element of the processor array $P_{i,j}$. In a four-neighbor architecture, processor 20 would be coupled to four orthogonally adjacent processors 31–34 by two-way interconnections such as line 50, such that each processor could receive data from its four nearest orthogonal neighbors. In an eight-neighbor architecture, processor 20 would also be interconnected with processors 41–44 by two-way diagonal interconnections such as 60. In this arrangement, each processor can receive data from its eight nearest neighbors. The complete system would also include input, output and control lines (not shown) connected to each processor, the control lines specifying the operations performed (e.g., $H_1$, $V_1$, $H_1^*$ and $V_1^*$) and multiplication constants. During each cycle of machine operation, each processor computes a new value for its corresponding image element as a function of the prior value of that element, and the prior values of its four or eight nearest neighbors. By means of the present invention, processor architecture such as that shown in FIG. 1 could be used to efficiently convolve large kernels with an image array, while retaining the inherently faster throughput rates of parallel processors with small neighborhood data access.

The technique disclosed by the present invention will also provide advantages in many cases in performing convolutions on computers having conventional sequential architectures. If an $m\times m$ kernel can be decomposed into separable components, the execution time is reduced by a factor of 2/m. If it cannot be made separable, it is always possible to decompose the kernel into a sum of separable kernels, but the speed advantage is partially eroded by the necessity to sum intermediate results. Multi-pass processing is facilitated by the definition of an algebra of convolutional primitives. Reducing kernels to algebraic expressions in terms of a nine member set of primitives provides insight into sequencing of efficient computations, which is particularly productive in the case of sets of kernels such as the Sobel directional derivatives where certain groups of primitive expressions occur repeatedly.

In principle, the five primitives defined on a four-neighbor architecture are capable of generating the same large kernels as the augmented set of nine primitives defined on the eight-neighbor processor. The question of whether one or the other of these sets provides more efficient convolution ultimately depends on the details of the processor architecture as well as the particular nature of the initial kernel. Preliminary estimates of the number of arithmetic operations for a number of commonly used kernels has shown that the five primitive set on a four-neighbor architecture generally requires fewer operations than generating the same large kernel with the nine primitive set on an eight-neighbor architecture.

Figure 2:
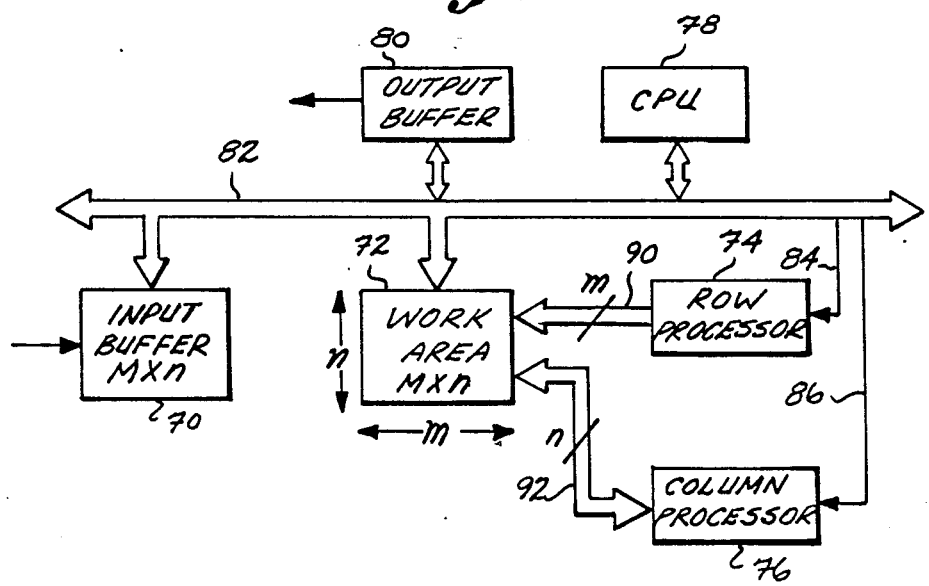
FIG. 2 is a block diagram of a preferred architecture for performing image processing according to the present invention.

The architecture shown in FIG. 1 provides one processor for each image element or pixel. A conventional, sequential architecture provides one processor for all pixels. FIG. 2 illustrates an intermediate architecture that is particularly suited to the convolution technique described herein. The image processing system shown in FIG. 2 includes input buffer 70, work area 72, parallel (row) processor 74, parallel (column) processor 76, CPU 78 and output buffer 80. The input and output buffers, the work area and the CPU are interconnected by system bus 82. The column and row processors are connected to system bus 82 via control lines 84 and 86, respectively. Finally, column processor 74 is connected to work area 72 by bus 90, and row processor 76 is connected to work area 72 via bus 92.

Input buffer 70, work area 72 and output buffer 80 each comprises memory means, such as random access memory, for storing an $m\times n$ image array. Data representing the image array to be processed is received by the system into input buffer 70, and a copy of the input image array is transferred into work area 72. When the image processing is complete, the modified image array is in output buffer 80, ready for subsequent use. CPU 80 controls and coordinates the various system elements.

As shown by way of example by Equation (37), in a preferred aspect of the present invention, the kernel W with which the image array is to be convolved is broken down into a linear combination of terms, each term comprising the convolutional product of one or more of the primitive kernels $H_1$, $H_1^*$, $V_1$, $V_1^*$, and I. The system shown in FIG. 2 operates by transferring a copy of the image array from input buffer 70 into work area 72, and then processing the array in work area 72 in accordance with one of the required terms. $H_1$ and $H_1^*$ operations are carried out by row processor 74, $V_1$ and $V_1^*$ operations are carried out by column processor 76, and steps involving the identity kernel are carried out by either the row or column processor. When the processing of the term is complete, the intermediate product representing that term is transferred from work area 72 to output buffer 80. As subsequent terms are calculated, the results are added to the data previously stored in output buffer 80, such that when all terms are completed, the entire kernel W has been convolved with the input image, and the result of that convolution is available in the output buffer.

Row processor 74 operates by sequentially reading complete rows of work area 72 (m elements), processing each row in parallel using the $H_1$, $H_1^*$ and/or I primitive kernels, and then returning the new values for that row to the locations in the work area from which that row was read. The row processor then proceeds to the next row, until all rows have been processed. Column processor 76 operates in a similar manner, by reading complete columns consisting of n data elements from the work area, and returning the results to the identical work area columns.

Figure 3:
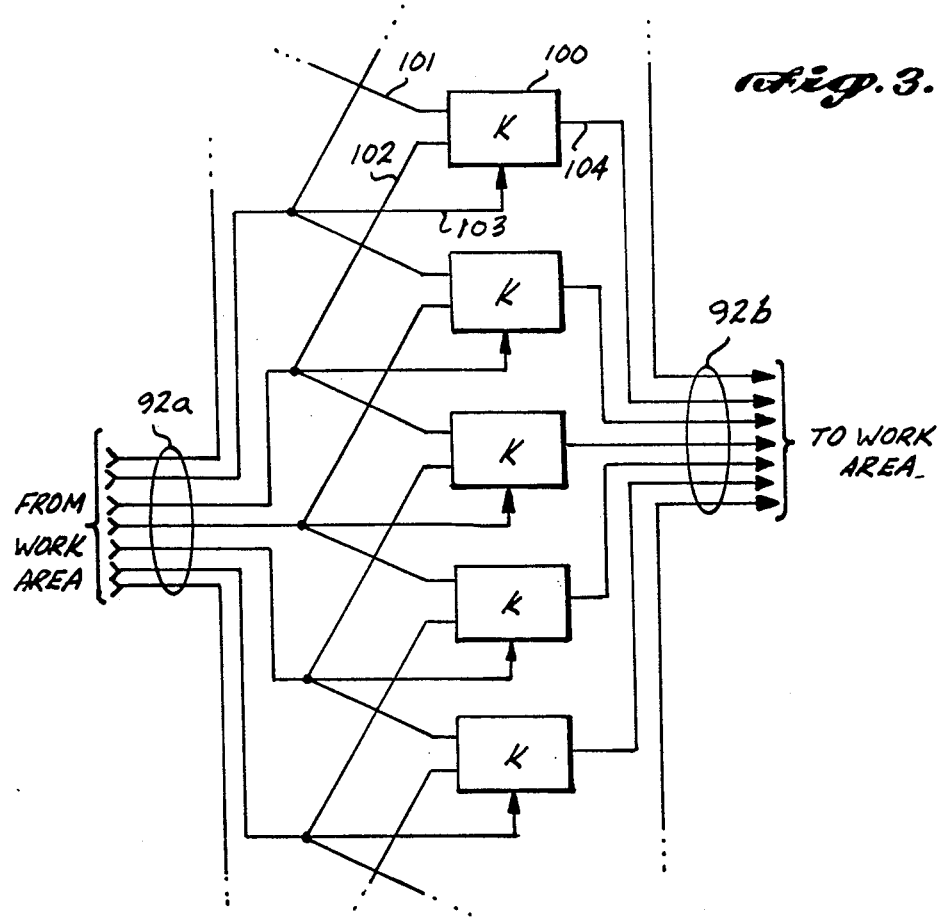
FIG. 3 is an expanded block diagram, showing further details of the row or column processor of FIG. 2.
Figure 4:
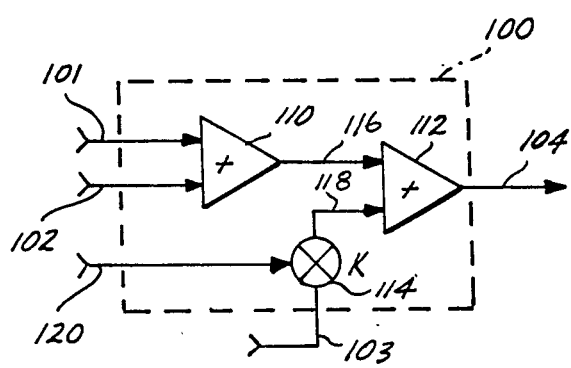
FIG. 4 is a circuit diagram showing one of the individual processors of FIG. 3.

A portion of column processor 74 is illustrated in further detail in FIGS. 3 and 4. The column processor receives data from the work area via bus 92a, and returns processed data to the work area via bus 92b, buses 92a and 92b together comprising bus 92 of FIG. 2. The column processor comprises a total of n individual processors 100, each of which receives three inputs on lines 101, 102 and 103, and produces an output on line 104. A processor 100 is illustrated in greater detail in FIG. 4. The processor includes adders 110 and 112 and multiplier 114. Adder 110 adds the signals received on lines 101 and 102, and produces a signal representing the sum of these signals on line 116. The signal on line 116 forms one input to adder 112. The signal on line 103 is input to multiplier 114 that multiplies such signal by a factor k, to produce an output signal on line 118 that forms the other input to adder 112. The output of adder 112 is the output of the processor on line 104. Processor 100 also includes input line 120 (not shown in FIG. 3) through which the processor may receive data representing the constant k from CPU 78.

By comparing FIGS. 3 and 4, it will be seen that the collection of processors 100 implements the one-dimensional convolution $H_1+k$ on the row input received from the work area via bus 92a. Row processor 74 may comprise an identical array of processors 100, except that here m individual processors are used. Row processor 74 and column processor 76 could also be combined into a single parallel processor containing m or n processors, whichever is larger.

Figure 5:
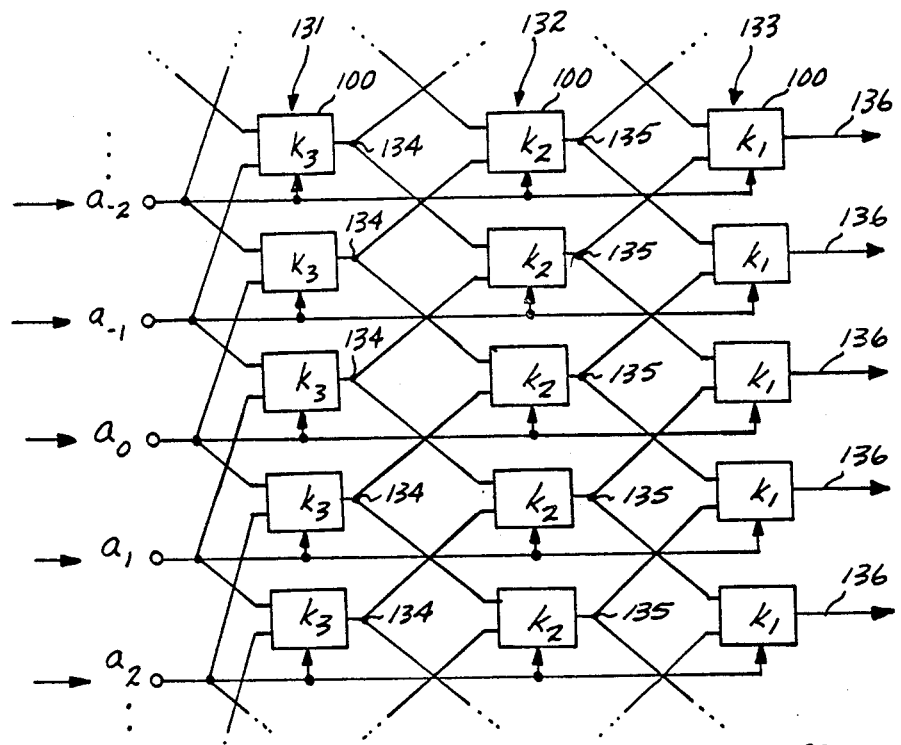
FIG. 5 is a schematic diagram showing a second preferred embodiment of the row or column processor of FIG. 2; and, FIG. 6 is a block diagram showing a third preferred embodiment of the row or column processor of FIG. 2.

A second preferred embodiment for the row or column processor is shown in FIG. 5. This embodiment uses a plurality of processors 100 that may be identical to those used in the embodiment of FIG. 3. However, in the embodiment of FIG. 5, processors 100 are arranged in columns or tiers 131, 132 and 133. The processors in the first tier 131 receive data directly from the work area, as with the embodiment shown in FIG. 3. The output of the processors in tier 131, on lines 134, is then input to the processors of the second tier 132. The output of the second tier processors, on lines 135, are input to the processors of tier 133, and the output of the processors in tier 133, on lines 136, are returned to the work area.

The processors of tiers 131, 132 and 133 use multiplication constants $k_3$, $k_2$, and $k_1$ respectively. If the inputs to tier 131 are designated by the sequence ... $a_{-2}, a_{-1}, a_0, a_1, a_2$ ..., then the middle processor in tier 131 calculates:

$$k_3 a_0 + a_{-1} + a_1$$

which corresponds to the convolution $k_3+H_1$. The corresponding output of tier 132 is then:

$$k_2 a_0 + k_3(a_{-1}+a_1) + (a_{-2}+2a_0+a_2)$$

which corresponds to $k_2+H_1(k_3+H_1)$. Finally, the output of tier 133 is given by:

$$k_1 a_0 + k_2(a_{-1}+a_1) + k_3(a_{-2}+2a_0+a_2) + (a_{-3}+3a_{-1}+3a_1+a_3)$$

which corresponds to $k_1+H_1(k_2+H_1(k_3+H_1))$. Thus, the row and column processor shown in FIG. 5 would be used for a pipelined computation of a kernel having a term cubic in $H_1$ or $V_1$. The parallel processor shown in FIG. 5 could of course be extended to any number of tiers.

Figure 6:
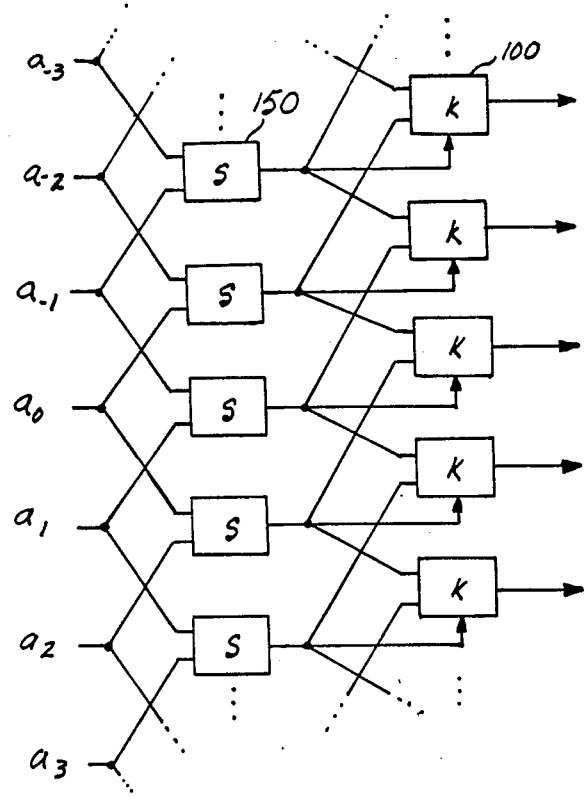

An implementation of the $V_1^*$ primitive is illustrated in FIG. 6. The parallel processor shown in FIG. 6 comprises a tier of substractors 150 followed by a tier of processors 100 of the type shown in FIG. 4. Each subtractor produces an output signal equal to the difference of its two input signals. With the connections as shown in FIG. 6, the parallel processor implements the convolution $V_1^*(k+V_1)$. To implement $V_1^*$ alone, only a single row of subtractors would be used. Identical implementations could of course be used for $H_1^*$, $H_1^*(k+H_1)$, etc. Higher order odd parity kernels could also be produced in a pipelined arrangement by adding further tiers of processors 100, as in FIG. 5.

While the preferred embodiments of the invention have been illustrated and described, variations will be apparent to those skilled in the art. Accordingly, the invention is not to be limited to the described embodiments, but is to be determined by reference to the following claims.

The embodiments of the invention in which an exclusive property or privilege is claimed are defined as follows:

1. A method of processing an image represented by a multidimensional image array of image elements by convolving the image array with a kernel, the method comprising convolving a decomposed form of the kernel with the image array to produce a modified array, the decomposed form comprising a linear combination of one or more terms, at least one term comprising the convolutional product of two or more primitive kernels, each primitive kernel having a center element and even or odd parity with respect to reflection about the center element along each of the dimensions of the image array.

2. The method of claim 1, wherein no primitive kernel has a length greater than 3 along any dimension of the image array.

3. The method of claim 1, where at least one term comprises the convolutional product of a first primitive kernel having more than one element along a first dimension with a second primitive kernel having more than one element along a different, second dimension.

4. The method of claim 3, wherein N is equal to two.

5. In a method of processing an image represented by a multidimensional image array of image elements by convolving the image array with a kernel, to produce a modified array, the improvement comprising:
   decomposing the kernel into a decomposed form comprising a linear combination of one or more terms, at least one term comprising the convolutional product of two or more primitive kernels, each primitive kernel having a center element and even or odd parity with respect to reflection about the center element along each of the dimensions of the image array;
   whereby the image array may be convolved with the decomposed form to produce the modified array.

6. The improvement of claim 5, comprising the further steps of decomposing the kernel into at least two subkernels, each subkernel having a center element and even or odd parity with respect to reflection about the center element along each of the dimensions of the image array, and decomposing each subkernel into a linear combination of one or more of said terms.

7. An apparatus for processing an image represented by a multidimensional image array of image elements by convolving the image array with a kernel to produce a modified array, the apparatus comprising:

memory means for storing the image array;

a parallel processor associated with at least one dimension of the image array, the parallel processor comprising means for receiving, in parallel, input data comprising a one-dimensional input portion of the image array extending along said one dimension, and means for convolving the input data with a decomposed form of the kernel, the decomposed form comprising a linear combination of one or more terms, at least one term comprising the convolutional product of two or more primitive kernels, each primitive kernel having a center element and even or odd parity with respect to reflection about the center element along said one dimension.

8. The apparatus of claim 7, wherein the image array comprises a plurality of one-dimensional input portions, each input portion extending along said one dimension and comprising a plurality of image elements, and wherein the parallel processor includes means for successively receiving different ones of the input portions, and for convolving each input portion with the decomposed form to successively produce one-dimensional output portions, the modified array comprising the output portions.

9. The apparatus of claim 7, wherein the parallel processor comprises a plurality of processors, each processor being associated with a different image element of the one-dimensional input portion and comprising means for recalculating its associated image element by forming a linear combination of its associated image element and the image elements associated with two or more adjacent processors.

10. The apparatus of claim 9, wherein each processor comprises a multiplier for multiplying its associated image element by a constant to form an intermediate product, and one or more adders for adding the intermediate product to the image elements, associated with said adjacent processors.

11. The apparatus of claim 7, wherein the parallel processor comprises means for convolving the image array with the primitive kernels $D_1 = [1\ 0\ 1]$, $D_1^* = [1\ 0\ -1]$ and I, I being the identity kernel, to produce the modified array, the dimensions of $D_1$ and $D_1^*$ being along said one dimension.

12. The apparatus of claim 11, wherein the parallel processor comprises a plurality of subtracters and a processing cell associated with each subtractor, each subtracter being associated with a different image element of the one-dimensional input portion and comprising means for forming the difference between the image elements associated with adjacent processing cells along said one dimension.

13. The method of claim 1, 2, 5 or 3, wherein the image array has N dimensions, N being greater than one, and wherein each primitive kernel has a length of one along at least $N-1$ dimensions.

14. The method of claim 1, wherein each term has a center element and even or odd parity with respect to reflection about the center element along each of the dimensions of the image array.

15. The improvement of claim 6, wherein each subkernel has the same number of elements along each dimension of the kernel, and wherein no primitive kernel has a length greater than three along any dimension.

16. The improvement of claim 5, wherein no primitive kernel has a length greater than three along any dimension of the image array.

17. The improvement of claim 5 or 15, wherein the image array has N dimensions, N being greater than 1, and wherein each primitive kernel has a length of 1 along at least N-1 dimensions.

18. The improvement of claim 17, wherein N is equal to 2.

19. The apparatus of claim 7, wherein no primitive kernel has a length greater than 3 along any dimension of the image array.

20. The apparatus of claim 7, wherein at least one term comprises the convolution of product of a first primitive kernel having more than one element along a first dimension with a second primitive kernel having more than one element along a different, second dimension.

21. An apparatus for processing an image represented by a multi-dimensional image array of image elements by convolving the image array with a kernel, the apparatus comprising means for convolving a decomposed form of the kernel with the image array to produce a modified array, the decomposed form composing a linear combination of one or more terms, at least one term comprising the convolutional product of two or more primitive kernels, each primitive kernel having a center element, and even or odd parity with respect to reflection about the center element along each of the dimensions of the image array.

* * * * *